United States Patent
Nanda et al.

(10) Patent No.: US 8,869,538 B2
(45) Date of Patent: Oct. 28, 2014

(54) GAS TURBINE ENGINE FLOW PATH MEMBER

(75) Inventors: Sujit Nanda, Indianapolis, IN (US);
Todd S. Taylor, Whiteland, IN (US);
Brad Farris, Plainfield, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 321 days.

(21) Appl. No.: 13/334,974

(22) Filed: Dec. 22, 2011

(65) Prior Publication Data
US 2012/0159958 A1   Jun. 28, 2012

Related U.S. Application Data

(60) Provisional application No. 61/427,127, filed on Dec. 24, 2010.

(51) Int. Cl.
*F02C 7/20* (2006.01)
*F02C 7/12* (2006.01)
*F01D 25/14* (2006.01)

(52) U.S. Cl.
CPC . *F01D 25/14* (2013.01); *F02C 7/12* (2013.01); *Y02T 50/675* (2013.01)
USPC ............................................. 60/796; 60/785

(58) Field of Classification Search
USPC .................... 60/751–752, 785, 796, 799, 806
See application file for complete search history.

(56) References Cited

U.S. PATENT DOCUMENTS

| | | | |
|---|---|---|---|
| 3,965,066 A | 6/1976 | Sterman et al. | |
| 4,291,531 A | 9/1981 | Campbell | |
| 4,306,834 A | 12/1981 | Lee | |
| 4,893,983 A | 1/1990 | McGreehan | |
| 5,400,586 A * | 3/1995 | Bagepalli et al. | 60/800 |
| 6,418,727 B1 * | 7/2002 | Rice et al. | 60/799 |
| 6,540,477 B2 | 4/2003 | Glynn et al. | |
| 6,652,229 B2 * | 11/2003 | Lu | 415/190 |
| 6,672,072 B1 * | 1/2004 | Giffin, III | 60/782 |
| 6,895,757 B2 * | 5/2005 | Mitchell et al. | 60/772 |
| 7,000,404 B2 | 2/2006 | Palmisano et al. | |
| 7,303,372 B2 | 12/2007 | West et al. | |

(Continued)

OTHER PUBLICATIONS

International Search Report and Written Opinion, PCT/US2011/067136, Rolls-Royce North American Technologies Inc., Apr. 24, 2012.

*Primary Examiner* — Phutthiwat Wongwian
(74) *Attorney, Agent, or Firm* — Krieg DeVault LLP

(57) ABSTRACT

A gas turbine engine is disclosed having a compressor, combustor, and turbine and a flow path therethrough. A flow path member is disposed between an inner surface of the flow path and a rotating shaft that couples the compressor and turbine. The flow path member directs a cooling fluid along a path to cool a portion of the gas turbine engine between the inner surface and the rotating shaft. The flow path member is retained to permit radially free motion and can also be retained to permit axially free motion. The flow path member can have feed holes that permit the cooling fluid to pass.

15 Claims, 5 Drawing Sheets

(56) References Cited

U.S. PATENT DOCUMENTS

| | | |
|---|---|---|
| 7,465,148 B2 | 12/2008 | Klinger |
| 7,500,364 B2 | 3/2009 | Schumacher et al. |
| 7,571,611 B2 | 8/2009 | Johnson et al. |
| 7,594,401 B1 | 9/2009 | Chen et al. |
| 8,215,115 B2 * | 7/2012 | Adair et al. ............... 60/752 |
| 8,534,076 B2 * | 9/2013 | Woodcock et al. ......... 60/800 |
| 8,661,828 B2 * | 3/2014 | Pieussergues et al. ...... 60/752 |
| 2008/0282667 A1 | 11/2008 | Intile et al. |
| 2009/0145132 A1 | 6/2009 | Johnson et al. |
| 2010/0275614 A1 | 11/2010 | Fontaine et al. |

* cited by examiner

GAS TURBINE ENGINE FLOW PATH MEMBER

RELATED APPLICATIONS

The present application claims the benefit of U.S. Provisional Patent Application No. 61/427,127 filed Dec. 24, 2010 which is incorporated herein by reference.

GOVERNMENT RIGHTS

The present inventions were made with U.S. Government support under contract number FA8650-07-2803 awarded by U.S. Air Force. The United States Government may have certain rights in the present inventions.

TECHNICAL FIELD

The present invention generally relates to gas turbine engines, and more particularly, but not exclusively, to gas turbine engine cooling.

BACKGROUND

Providing flow paths and members to provide flow paths to direct fluid within gas turbine engines remains an area of interest. Such fluid can be a cooling or a heating fluid. Some existing systems have various shortcomings relative to certain applications. Accordingly, there remains a need for further contributions in this area of technology.

SUMMARY

One embodiment of the present invention is a unique flow path member used within a gas turbine engine. Other embodiments include apparatuses, systems, devices, hardware, methods, and combinations for directing a fluid within a space of the gas turbine engine. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
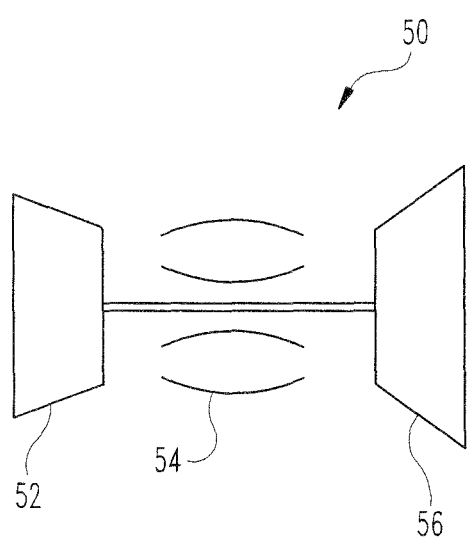
FIG. 1 depicts one embodiment of a gas turbine engine.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, a gas turbine engine 50 is disclosed having a compressor 52, combustor 54, and turbine 56 and can be used in some embodiments as a power source. In one non-limiting form the gas turbine engine 50 is used as a powerplant for an aircraft. As used herein, the term "aircraft" includes, but is not limited to, helicopters, airplanes, unmanned space vehicles, fixed wing vehicles, variable wing vehicles, rotary wing vehicles, unmanned combat aerial vehicles, tailless aircraft, hover crafts, and other airborne and/or extraterrestrial (spacecraft) vehicles. Further, the present inventions are contemplated for utilization in other applications that may not be coupled with an aircraft such as, for example, industrial applications, power generation, pumping sets, naval propulsion, weapon systems, security systems, perimeter defense/security systems, and the like known to one of ordinary skill in the art.

The gas turbine engine 50 can take a variety of forms in various embodiments. Though depicted as an axial flow single spool engine, in some forms the gas turbine engine 50 can have multiple spools and/or can be a centrifugal or mixed centrifugal/axial flow engine. In some forms the engine 50 can be a turboprop, turbofan, or turboshaft engine. Furthermore, the engine can be an adaptive cycle and/or variable cycle engine. Other variations are also contemplated.

Figure 2:
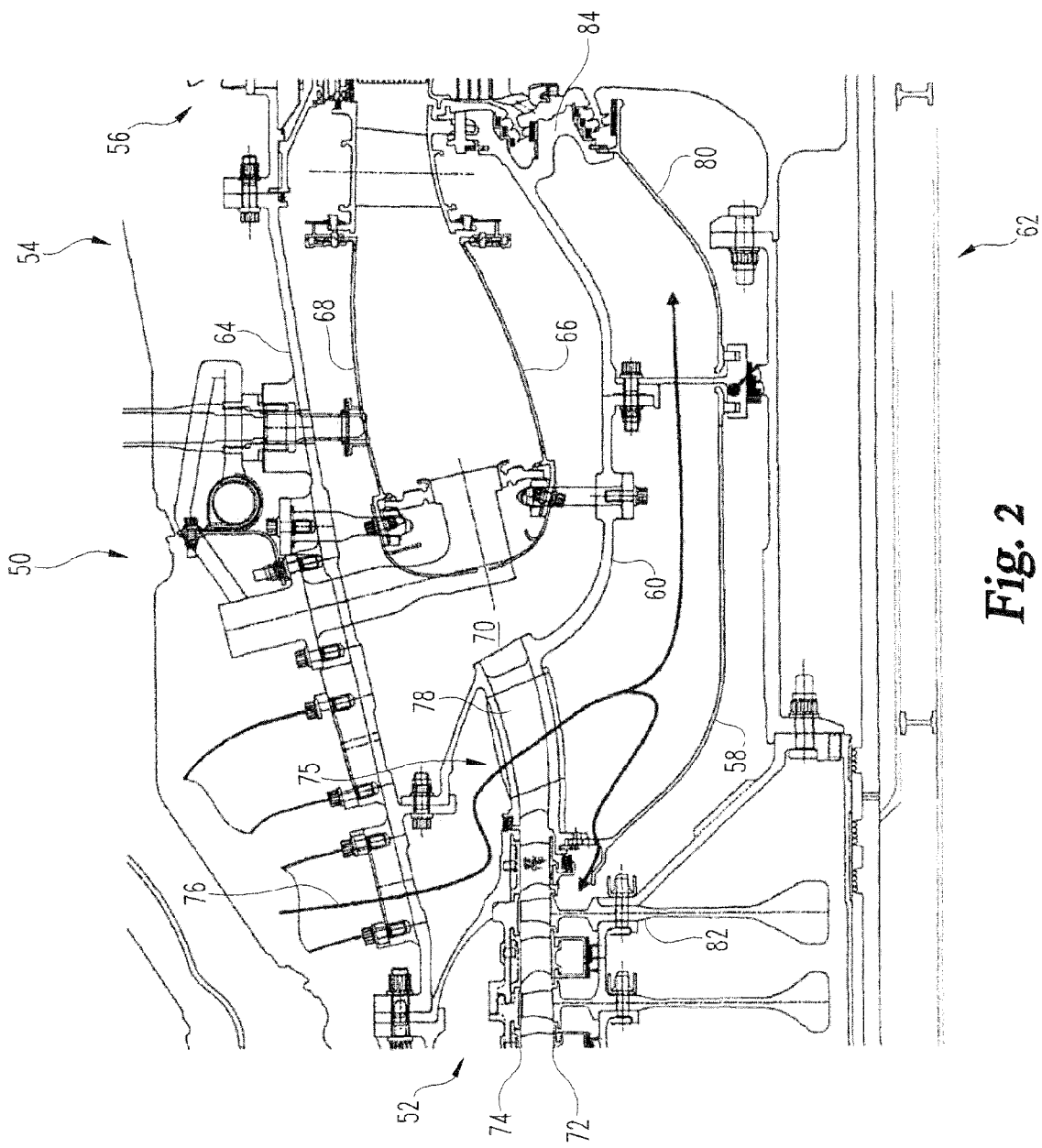
FIG. 2 depicts one embodiment of a flow path of a gas turbine engine.

Turning now to FIG. 2, one embodiment of the gas turbine engine 50 is depicted which includes a flow shield 58 disposed between a flow path 70 of the gas turbine engine 50 and a shaft 62 that couples the compressor 52 to the turbine 56. In one non-limiting form, the flow shield 58 is positioned between a case 60 of the combustor 54 and the shaft 62. The combustor 54 of the illustrative embodiment includes an outer case 64 and the inner case 60 which together enclose an area in which fuel and air are mixed and combusted. The combustor 54 can also include an inner liner 66 and outer liner 68 forming an annular combustor. The combustor 54 can take other forms in different embodiments including can-annular. Variations other than those depicted in the illustrative embodiment are also contemplated.

As mentioned above, the gas turbine engine 50 includes a flow path 70 for air through the compressor 52, into the combustor 54, and continuing to the turbine 56. Generally speaking, the flow path 70 will be annular in shape and formed between an inner surface and an outer surface. In one non-limiting example shown in the figure, the flow path 70 through the compressor 52 is formed between the inner surface 72 and outer surface 74 of the compressor 52. The flow path 70 through the combustor 54 can be between the inner liner 66 and outer liner 68 in one instance, or between the inner liner 68 and inner case 60 in another, as well as other variations.

A supplemental flow path 76 is also provided in the illustrative embodiment of the gas turbine engine 50 and is configured to deliver an air to an area between the rotating shaft 62 and other components or surfaces of the gas turbine engine 50, such as the inner surface of the flow path 70. In one embodiment the air delivered through the supplemental flow path 76 is an air at a different temperature than a component or components of the gas turbine engine 50 that receive the air. Such an air can be a cooling air. As used herein, the term "air", as well variations such as "compressed air", "cooling air", etc., can include any working fluid having the composition of air or any other suitable fluid composition. Furthermore, the fluid passing through the flow path 70 can, but need not, be identical to the fluid passing through the supplemental flow path 76. In some embodiments of the gas turbine engine 50, the supplemental flow path 76 can originate at an upstream portion of the flow path 70, such as an upstream stage of a multi-stage compressor 52. In just on non-limiting example, the source of the supplemental flow path 76 can be on a radially outer side of the flow path 70, such as through the outer surface 74 of the flow path 70. The source can be from other locations in and around the gas turbine engine 50.

The supplemental flow path 76 can be routed in, around, or through a variety of components of the gas turbine engine 50. In the illustrative embodiment, the supplemental flow path 76 is formed through a strut 78 of a diffuser 75, but other embodiments may not be routed through the diffuser. A number of struts 78 can be disposed circumferentially around the diffuser through which the cooling air can be passed. However, not all diffuser struts 78 need to be configured to pass the cooling air. Furthermore, though the strut 78 is depicted as formed through the diffuser 75, in other embodiments the strut 78 can be located elsewhere.

The supplemental flow path 76 directs the cooling air to an area in which it encounters the flow shield 58. In the illustrative embodiment the flow shield 58 is oriented and coupled to the gas turbine engine 50 to reduce and or eliminate windage heating to the cooling air from the rotating shaft 62, as well as aiding the engine thrust balance by dividing the cavity below the combustor 54 and creating a pressure difference which acts on a forward conical wall of the flow shield 58. As will be described further below, the flow shield can include multiple components such as the flow shield 58 and the flow shield 80. The flow shield 58 can be used to provide a surface in flow communication with the compressor 52; the flow shield 80 can be used to provide a surface in flow communication with the turbine 56. In the illustrative embodiment the flow shield 58 is in flow communication with a compressor rotor 82 and the flow shield 80 is in flow communication with a turbine preswirler 84.

Figure 3:
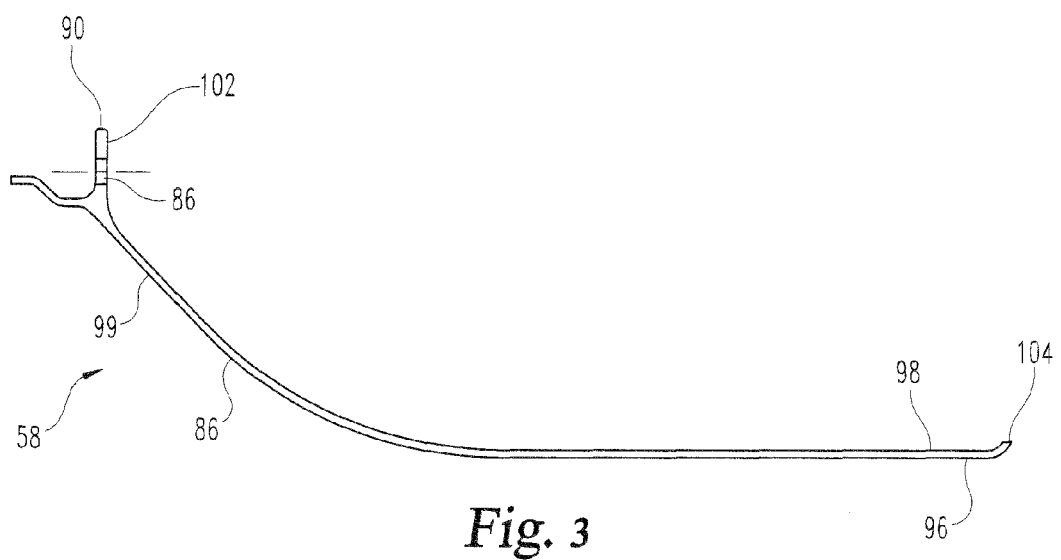
FIG. 3 depicts one embodiment of a flow shield.
Figure 4:
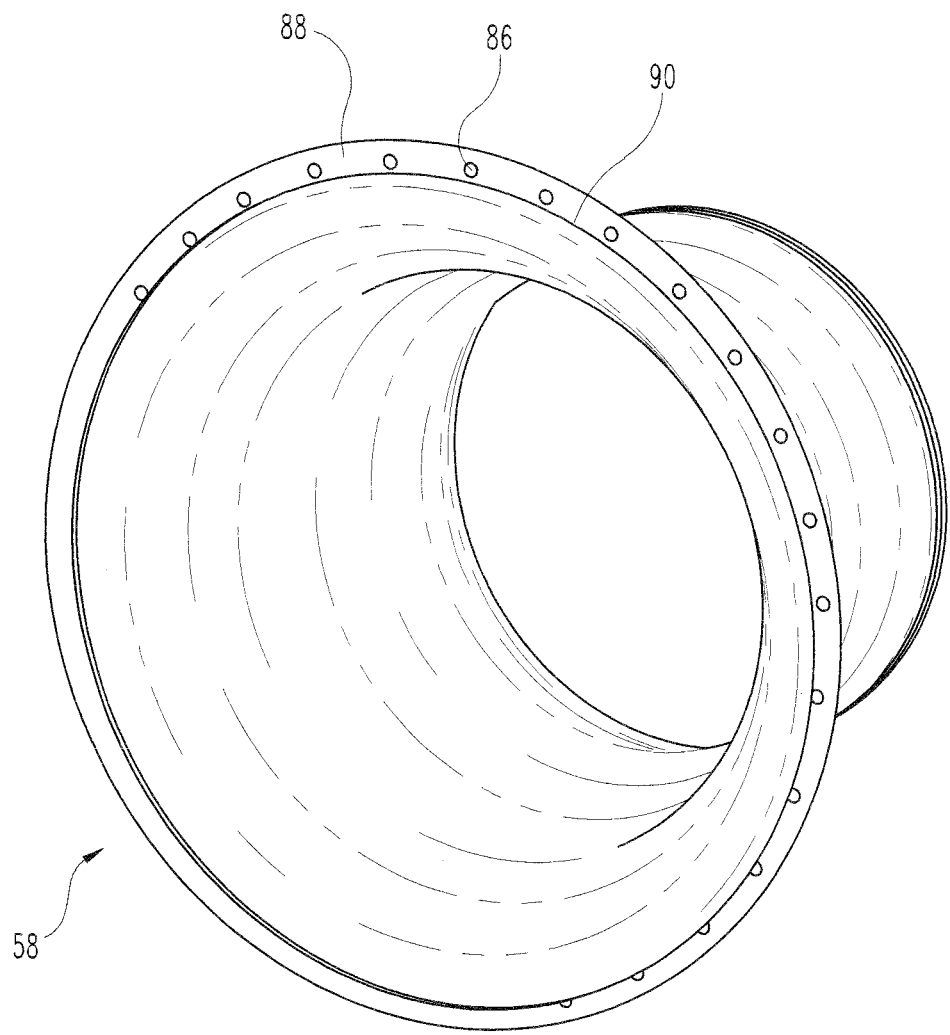
FIG. 4 depicts one embodiment of a flow shield.
Figure 5:
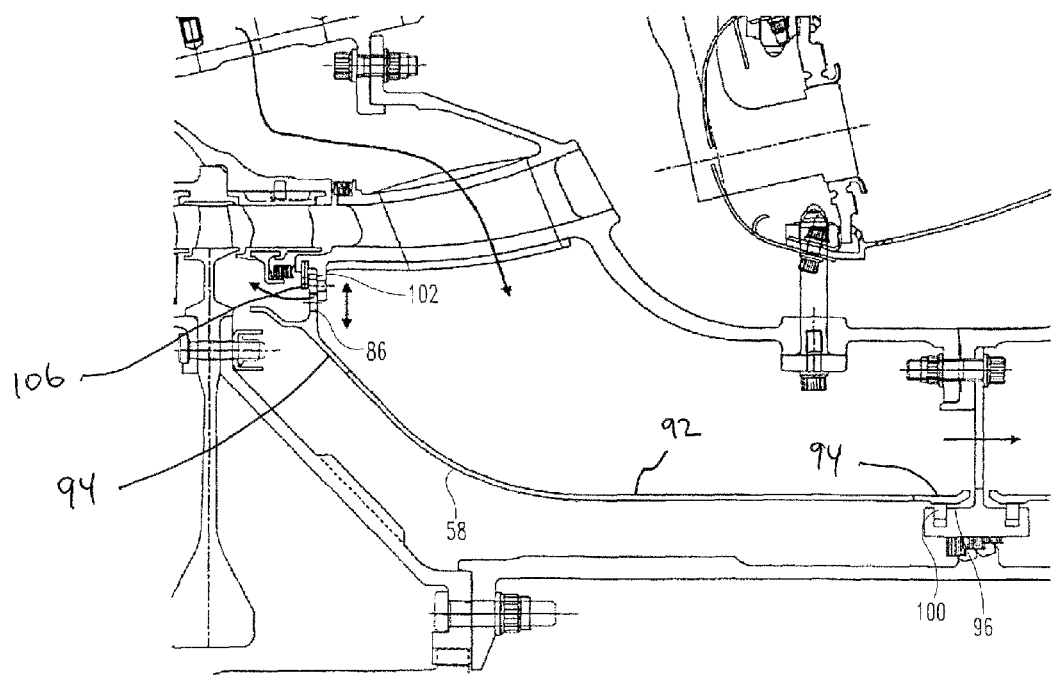
FIG. 5 depicts one embodiment of a flow shield retained in a gas turbine engine.

Turning now to a description of one aspect of the flow shield, one non-limiting embodiment of the flow shield 58 is depicted in FIGS. 3 and 4. Though the figures and the description that follow discuss features and variations of the flow shield 58, it will be appreciated that the flow shield 80 can have similar features and variations. The flow shield 58 of the illustrative embodiment is conical in shape as seen in FIG. 5 and can include a number of features such as feed holes 86 and cross keys 88. Any number, size, shape, and/or spacing of feed hole 86 can be used. The feed holes 86 can be provided through a flange 90 of the flow shield 58 and in the illustrative embodiment, thirty-six circular shaped feed holes are provided and are evenly distributed around the circumference of the flow shield 58. Different embodiments can use variations other than those depicted in the illustrative embodiment. Other embodiments can also have variations in the cross keys 88. Three cross keys 88 are provided in the illustrative embodiment and are used to discourage circumferential migration of the flow shield 58 by engaging pins (not shown) captured in the gas turbine engine. In the illustrative embodiment the pins are captured in the diffuser 75 but in other embodiments the pins can be located elsewhere.

In one non-limiting embodiment the flow shield 58 can be made by coupling a sheet metal middle section 92 welded with end forgings 94 (as seen for example in FIG. 5). The sheet metal can be made from IN 718 sheet and can be formed into a cylinder and welded using a GTAW Class II weld. Thereafter the sheet metal can be further formed into a final, or near-final, conical form. The end forgings 94 can be made from IN 718 and can be coupled with the formed sheet metal using GTAW Class I welds. Non-limiting locations of the welds that couple the end forgings is shown by reference numerals 98 and 99. Though both the sheet metal 92 and the end forgings 94 are formed from the same material, other embodiments can use a different material or materials for either or both the sheet metal middle section 92 and end forgings 94. Furthermore, the flow shield 58 and/or portions of the flow shield 58 can be made using a variety of other techniques other than those described above.

The flow shield 58 can also include stiffening portions such as stiffening ribs 104 formed near an end of the flow shield 58. The stiffening portions can be formed in a variety of locations including, but not limited to, the ends of the flow shield 58 as depicted.

Turning now to FIG. 5, and with continuing reference to the preceding figures, the flow shield 58 includes a number of features that permit it to be coupled to the gas turbine engine 50. The flow shield 58 of the illustrative embodiment includes a seal land 96 near one end which is used to provide a seal. The seal land 96 is located within the end forging 94 but other embodiments can include a seal land 96 in other locations. The seal land 96 can be engaged with an outspringing piston ring 100 but in some embodiments the seal land 96 can be engaged with one or more components other than an outspringing piston ring 100.

The flow shield 58 also includes a surface 102 which can be captured within a component of the gas turbine engine 50. The surface 102 can be a part of a protrusion formed anywhere in the flow shield 58. In the illustrative embodiment the surface 102 is a part of the flange 90 formed near an end of the flow shield 58 and is captured between a portion of the diffuser 75 and a retaining ring 106. A variety of techniques to couple the flow shield 58 other than that shown by use of the retaining ring 106 are contemplated.

The flow shield 58 of the illustrative embodiment is coupled to the gas turbine engine 50 such that it is free to move in certain directions. For example, the flange 90 is oriented in a direction that permits the axially forward end of the flow shield 58 freedom to move radially. The seal land 96 of the axially aft end of the flow shield 58 engages the outspringing piston ring 100 in a manner that permits axial and radial freedom of movement. It is contemplated that the flow shield 58 in other embodiments can be engaged within the gas turbine engine 50 in other manners to permit the same or different freedom of movement.

One aspect of the present application provides an apparatus comprising a gas turbine engine including a rotatable shaft coupling a compressor and turbine and having a working fluid flow path through the compressor, a combustor, and the turbine, and a fluid flow path structured to pass a fluid and disposed between the shaft and a radially inner surface of the working fluid flow path, the fluid flow path including a flow directing member that is stationary relative to the rotatable shaft, the flow directing member retained within the gas turbine engine via a coupling that permits radially free motion relative to the working fluid flow path during operation of the gas turbine engine.

A feature of the present application provides wherein the flow directing member is located in axial proximity to the combustor and wherein the radially inner surface of the working fluid flow path is a case of the combustor.

Another feature of the present application provides wherein the flow directing member is annular and includes a protruding member at an end, the protruding member slidably retained in a component of the gas turbine engine.

Yet another feature of the present application provides wherein the protruding member is a flange and which further includes a plurality of flow apertures located near the protruding member that admit the fluid in the fluid flow path.

Still another feature of the present application provides wherein the flow directing member is in contact with a portion of the gas turbine engine at another end, the contact permitting axially free and radially free movement of the flow directing member.

A further feature of the present application provides wherein the fluid is a cooling fluid and wherein the fluid flow path splits near the flow directing member to form a first branch path and a second branch path, the first branch path directed to the compressor and the second branch path directed to a turbine of the gas turbine engine.

A yet further feature of the present application provides wherein the flow directing member is retained between a circumferential fastening component and a surface of a diffuser located between the compressor and the combustor, wherein the combustor includes an inner liner and an outer liner, and wherein the compressor of the gas turbine engine is an axial flow compressor.

Another aspect of the present application provides an apparatus comprising a gas turbine engine having a compressor, combustor, and turbine, the compressor and turbine coupled to rotate together via a shaft, the combustor having an inner case and an outer case, a cooling flow path disposed in the gas turbine engine and configured to pass a cooling flow, and a flow directing device locate between a later stage of the compressor and the turbine and having a flow surface positioned between the rotatable shaft and the inner case of the combustor, the flow directing device structured to discourage windage heating of the cooling flow.

A feature of the present application provides wherein the flow directing device is stationary relative to a rotating component of the gas turbine engine.

Another feature of the present application provides wherein the flow directing device includes a second flow surface positioned between the rotatable shaft and the inner case of the combustor, the cooling flow path and the second flow surface oriented to pass the cooling flow axially toward the turbine.

Yet another feature of the present application provides wherein the flow directing device includes a first flow directing device having the flow surface and a second flow directing device having the second flow surface, each of the flow directing devices having ends that are coupled to the gas turbine engine to permit radially and axially free movement.

Still another feature of the present application provides wherein the flow directing device includes a sheet metal portion welded to a forged end portion.

Yet still another feature of the present application provides wherein the flow directing device includes stiffening ribs at an end portion.

A further feature of the present application provides wherein the cooling flow path includes a portion directed radially inward toward the shaft upstream of the flow surface, the cooling flow path structured to pass a cooling flow from an upstream location in the compressor.

A still further feature of the present application provides wherein the cooling flow path passes through a diffuser downstream of the compressor, and wherein the cooling flow path and the flow surface oriented to pass the cooling flow axially toward the compressor.

Yet another aspect of the present application provides an apparatus comprising a gas turbine engine having a rotatable shaft coupling a compressor and a turbine, a combustor disposed between the compressor and turbine and operable to combust a mixture of a working fluid and a fuel, and a fluid pathway structured to deliver a fluid to an area between a casing of the combustor and the shaft, and means for directing the fluid toward the compressor.

A feature of the present application provides wherein the fluid is a cooling fluid and which further includes means for coupling the means for directing the fluid within the gas turbine engine.

Still another aspect of the present application provides a method comprising flowing a working fluid through a passage in communication with a combustor of a gas turbine engine, the passage having a radially inner wall and a radially outer wall, passing a cooling fluid to an area radially inward of the radially inner wall; and between the combustor and a rotating shaft of the gas turbine engine, and discouraging windage heating by shielding the rotating shaft of the gas turbine engine from the cooling fluid using a relatively fixed flow member disposed radially outward of the rotating shaft.

A feature of the present application further includes flowing the cooling fluid axially aft to a turbine of the gas turbine engine.

Another feature of the present application further includes branching the cooling fluid such that a portion flows axially forward to a compressor of the gas turbine engine.

Yet another feature of the present application further includes supporting the relatively fixed flow member on one end and permitting radially free movement of the end.

Still another feature of the present application further includes coupling the fixed flow member to a portion of the gas turbine engine to permit radially and axially free motion.

Yet still another feature of the present application further includes passing the cooling fluid through apertures formed in the relatively fixed flow member.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:
1. An apparatus comprising:
a gas turbine engine including a rotatable shaft coupling a compressor and turbine and having a working fluid flow path through the compressor, a combustor, and the turbine; and
a fluid flow path structured to pass a fluid and disposed between the shaft and a radially inner surface of the working fluid flow path, the fluid flow path including a flow directing member that is stationary relative to the rotatable shaft, the flow directing member retained within the gas turbine engine via a coupling that includes a protruding member at an end such that the protruding member is slidably retained in a component of the gas turbine engine to permit radially free motion relative to the working fluid flow path during operation of the gas turbine engine;

wherein the flow directing member is in contact with a portion of the gas turbine engine at another end, the contact permitting axially free and radially free movement of the flow directing member.

2. The apparatus of claim 1, wherein the flow directing member is located in axial proximity to the combustor and wherein the radially inner surface of the working fluid flow path is a case of the combustor.

3. The apparatus of claim 1, wherein the flow directing member is annular.

4. The apparatus of claim 3, wherein the protruding member is a flange and which further includes a plurality of flow apertures located near the protruding member that admit the fluid in the fluid flow path.

5. The apparatus of claim 1, wherein the fluid is a cooling fluid and wherein the fluid flow path splits near the flow directing member to form a first branch path and a second branch path, the first branch path directed to the compressor and the second branch path directed to a turbine of the gas turbine engine.

6. The apparatus of claim 1, wherein the flow directing member is retained between a circumferential fastening component and a surface of a diffuser located between the compressor and the combustor, wherein the combustor includes an inner liner and an outer liner, and wherein the compressor of the gas turbine engine is an axial flow compressor.

7. An apparatus comprising:
a gas turbine engine having a compressor, combustor, and turbine, the compressor and turbine coupled to rotate together via a shaft, the combustor having an inner case and an outer case;
a cooling flow path disposed in the gas turbine engine and configured to pass a cooling flow; and
a flow directing device located between a later stage of the compressor and the turbine and having a flow surface positioned between the rotatable shaft and the inner case of the combustor, the flow surface of the flow directing device being a radially outer surface that forms a cooling flowpath surface, the flow directing device also having a radially inner surface that forms a windage heating surface, where the flow directing device is structured to discourage windage heating of the cooling flow being passed in the cooling flow path by virtue of being interposed between the rotatable shaft and the inner case of the combustor, the flow directing device having a first coupling portion structured to permit radially free movement and a second coupling portion structured to permit axially free movement.

8. The apparatus of claim 7, wherein the flow directing device is stationary relative to a rotating component of the gas turbine engine.

9. The apparatus of claim 8, wherein the flow directing device includes a second flow surface positioned between the rotatable shaft and the inner case of the combustor, the cooling flow path and the second flow surface oriented to pass the cooling flow axially toward the turbine.

10. The apparatus of claim 9, wherein the flow directing device includes a first flow directing device having the flow surface and a second flow directing device having the second flow surface, wherein the first coupling portion of the first flow directing device is an end portion and the second coupling portion of the first flow directing device is another end portion, and wherein the second flow directing device having ends that are coupled to the gas turbine engine to permit radially and axially free movement.

11. The apparatus of claim 8, wherein the flow directing device includes a sheet metal portion welded to a forged end portion.

12. The apparatus of claim 8, wherein the flow directing device includes stiffening ribs at an end portion.

13. The apparatus of claim 7, wherein the cooling flow path includes a portion directed radially inward toward the shaft upstream of the flow surface, the cooling flow path structured to pass a cooling flow from an upstream location in the compressor.

14. The apparatus of claim 8, wherein the cooling flow path passes through a diffuser downstream of the compressor, and wherein the cooling flow path and the flow surface oriented to pass the cooling flow axially toward the compressor.

15. An apparatus comprising:
a gas turbine engine having a rotatable shaft coupling a compressor and a turbine, a combustor disposed between the compressor and turbine and operable to combust a mixture of a working fluid and a fuel; and
a fluid pathway structured to deliver a fluid to an area between a casing of the combustor and the shaft;
means for directing the fluid toward the compressor; and
a first support means for restraining axial movement and permitting radial movement of the fluid pathway relative to a static support structure of the gas turbine engine;
wherein the fluid is a cooling fluid and which further includes a second support means for restraining radial movement and permitting axial movement of the fluid pathway relative to a static support structure of the gas turbine engine.

* * * * *